Jan. 12, 1932.　　　L. W. EGGLESTON　　　1,841,326
CONTROLLING MEANS
Filed May 23, 1925　　　2 Sheets-Sheet 2
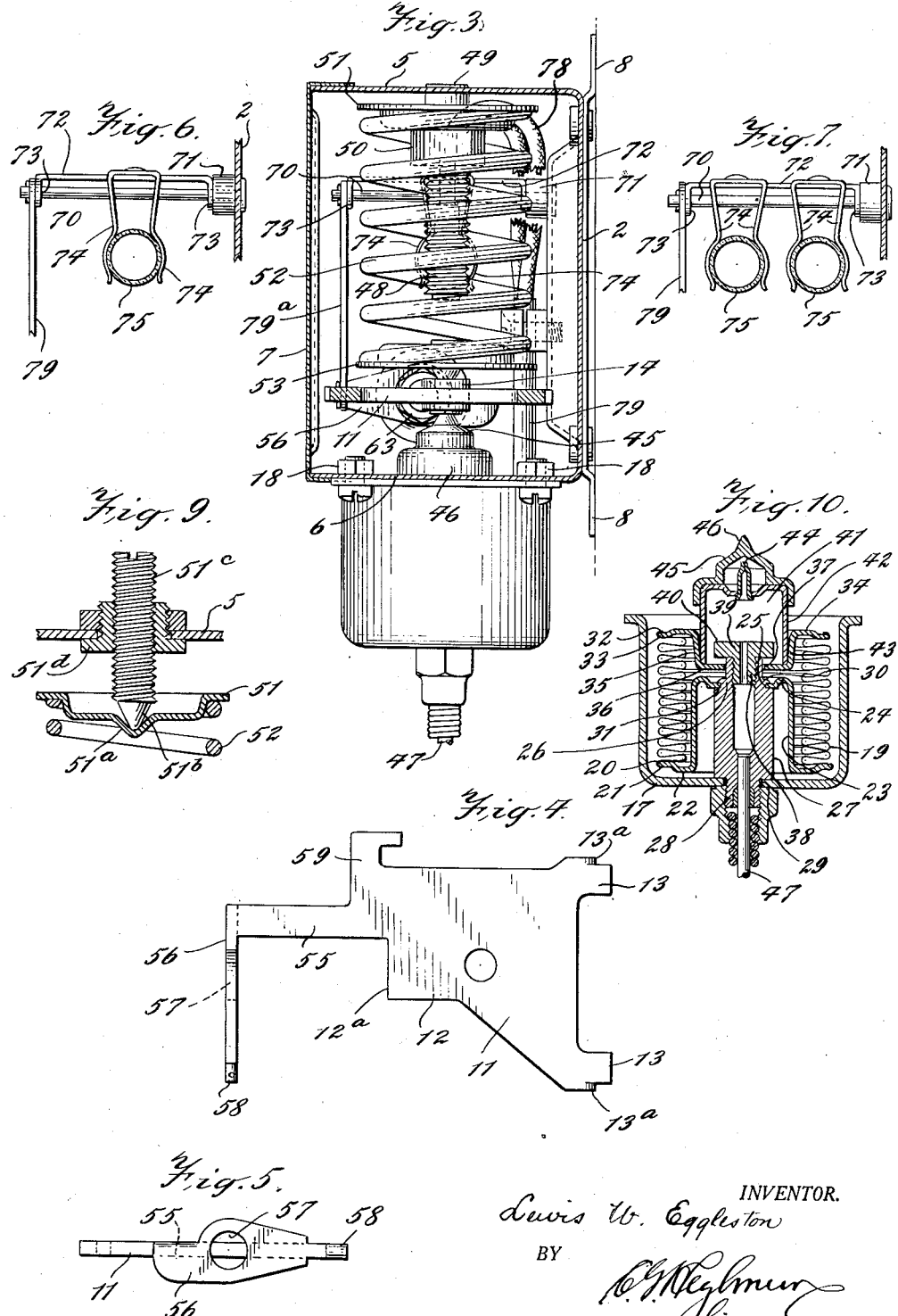
INVENTOR.
Lewis W. Eggleston
BY
his ATTORNEY.

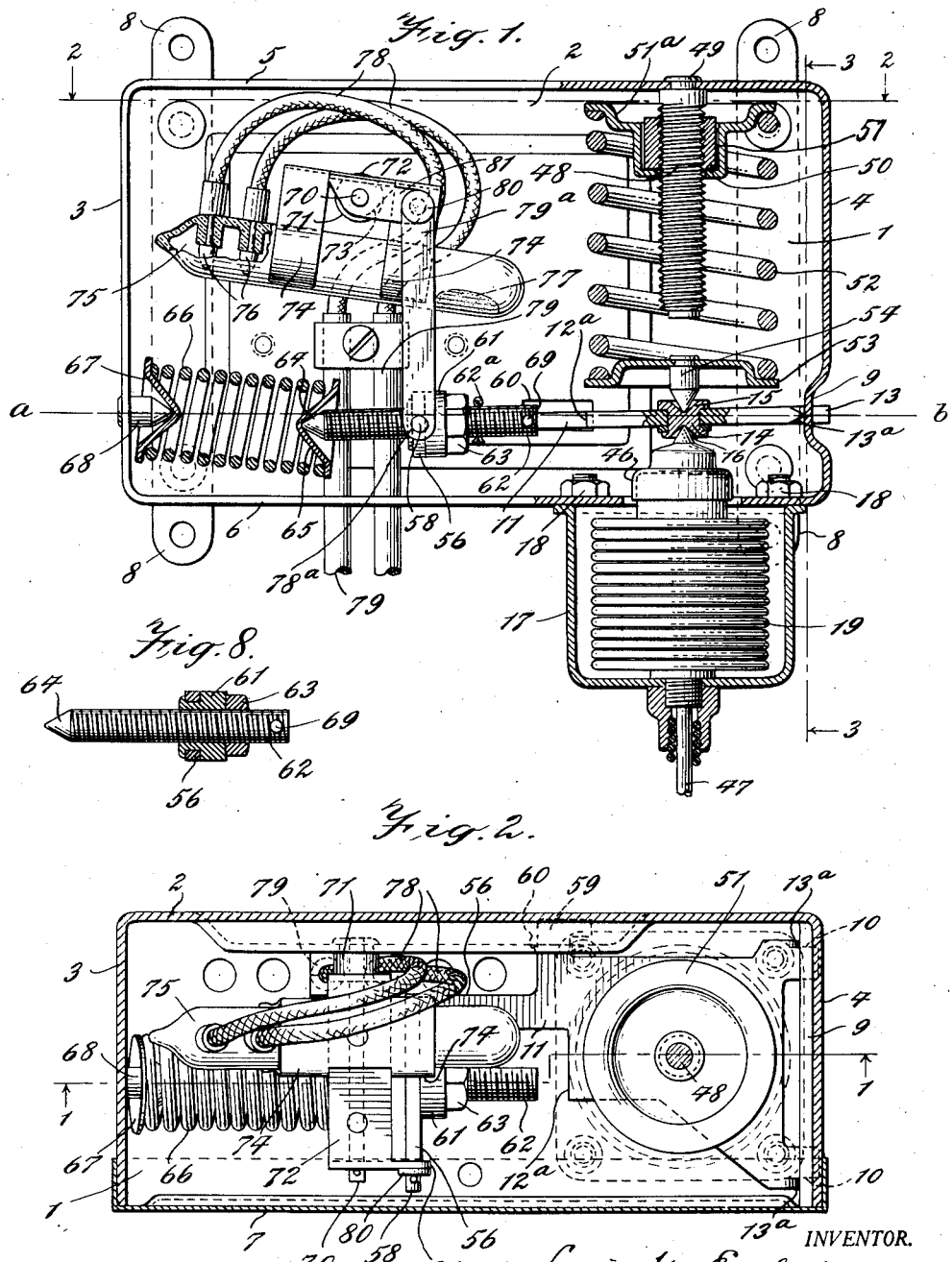

Patented Jan. 12, 1932

1,841,326

UNITED STATES PATENT OFFICE

LEWIS W. EGGLESTON, OF BUFFALO, NEW YORK, ASSIGNOR TO AMERICAN RADIATOR COMPANY, OF NEW YORK, N. Y., A CORPORATION OF NEW JERSEY

CONTROLLING MEANS

Application filed May 23, 1925. Serial No. 32,401.

My invention relates broadly and generally to new and useful improvements in controlling means adapted to respond to hygroscopic, thermostatic, or pressure conditions, or other variable factor, in order to control a desired device or mechanism, for example, a switch for making or breaking an electric circuit. While the invention is capable of various embodiments, for the purposes of illustration and disclosure I hereinafter describe the same as embodied in an electric switch-controlling means responsive to variations in temperature or pressure whereby the switch is operated.

The primary object of the invention is to provide a mechanism of the character mentioned which will be simple in construction, and which will be prompt, positive and efficient in accomplishing the objects for which it is devised.

A further object is to provide a mechanism which will function efficiently at desired differentials, for example, of temperature or pressure.

The invention consists in the improved construction and combination of parts, to be more fully described hereinafter and the novelty of which will be particularly pointed out and distinctly claimed.

In the accompanying drawings, I have fully and clearly illustrated a preferred embodiment of my invention, to be taken as a part of this specification and wherein—

Figure 1 is a view in front elevation with the front plate of a casing removed, and showing the internal mechanism partly in elevation and partly in section on the line 1—1 of Fig. 2;

Fig. 2 is a section on the line 2—2 of Fig. 1;
Fig. 3 is a section on the line 3—3 of Fig. 1;
Fig. 4 is a plan view of an actuating lever;
Fig. 5 is an end view of the actuating lever looking from the left of Fig. 4;

Figs. 6 and 7 are detail views, partly in section, of certain forms of circuit-controlling devices or switches adapted to be operated by the mechanism constituting my invention;

Fig. 8 is a detail section view of an adjusting means;

Fig. 9 is a detail section view of another form of adjusting means for regulating the power of a spring forming one of the elements of the embodiment shown, and Fig. 10 is a central, longitudinal, sectional view through a power means for operating a preferred embodiment of the invention.

Referring to the drawings by characters of reference, 1 designates generally, a casing of any suitable form, but preferably comprising a rectangular, sheet-metal shell, including a rear wall 2, end walls 3, 4, a top wall 5, and a bottom wall 6, said casing being open at its front portion, and closed by a closure plate, for example, a slip-cover 7. The rear wall of the casing is secured to suitable brackets or wall plates 8, by means of which the casing may be secured to a wall or other suitable supporting surface.

In the end wall 4, and preferably adjacent the lower portion thereof, is an inwardly directed, transverse boss 9, having spaced apertures 10, for a purpose to be presently described.

Within the casing is located an actuating member, preferably in the form of a lever, shown generally at 11, and consisting of a flat plate 12, having at one end spaced lugs 13 inserted in the openings 10 heretofore described, and at the base of which lugs are bevel or knife-edges 13ª adapted to bear on said boss 9, in order to provide a fulcrum support for said lever, whereby the latter is adapted to swing vertically in the casing. In an opening in the lever plate 12 is supported, preferably by riveting, a bearing member 14 having upper and lower conical sockets 15, 16, preferably directly opposite each other, and constituting bearing seats, for a purpose to be presently described.

Supported by the lower wall 6 of the casing, is a chamber or jacket 17, secured to said wall by bolts 18, and in this chamber is arranged an expansible-collapsible element which responds to the pressure or temperature conditions controlling the operation of the mechanism. This power element is illustrated in Fig. 10 and comprises a resilient, corrugated, expansible-collapsible vessel 19, the lower edge portion of which is secured and sealed in any suitable manner, as at 20, to the flange 21 of a rigid head 22 having a reentrant cylindrical portion 23 extending within said vessel, and having an internal end head 24. The head 24 is formed with a central opening 25 seated over a reduced end 26 on the upper end of a tubular rigid post 27 arranged centrally of the portion 23, and at its lower end having a reduced threaded nipple 28 extending through an opening 29 in the bottom of the chamber 17, said nipple having threaded thereon a clamping gland which when screwed into place rigidly secures the post to the chamber, the wall of the latter being clamped between a shoulder on the post at the base of the part 28, and said gland. The wall 24 is rigidly secured to the post by upsetting a portion of the latter, as at 30, over the wall so as to clamp the same against a shoulder 31 on the post. By the means just described, the head 22 is rigidly secured and sealed in place, and constitutes an anchorage or abutment relative to which the element 19 may project and retract longitudinally.

The upper edge of the element 19 is secured and sealed in any suitable manner, as at 32, to a circumferential edge or flange 33, on a closure-head 34 having a reentrant cylindrical portion 35 extending to a point within the vessel adjacent the head 24, and having an end head 36 formed with a central opening 37. The reduced portion 26 extends through the opening 37, and is threaded internally to receive the shank 38 of a tubular plug 39, the latter having a head 40 located within the reentrant part 35 and laterally overlying the head 36 to limit upward expansive movement of the element 19. The opening 37 is of sufficient size to provide sufficient clearance between it and the portion 26, to provide for free movement of the element 19 when projecting and retracting, and also to permit passage or flow of the pressure agent, as will be presently described. The retracting movement of the element 19 is limited by engagement of the head 36 with the head 24.

Attached to the head 36 is a plunger member, preferably in the form of an inverted cup-shaped, stamped metal element 41, the side wall or flange 42 of which is seated and held in the socket in said head 36, preferably by friction and soldering, or brazing, as at 43. The end wall 42 has secured thereto a charging or filling tube 44, by which the element 19 may be charged, or evacuated and charged, with a suitable volatile constituting a temperature-responsive medium. After charging, the tube 44 is sealed by pinching its walls together to close the bore therethrough, or by other suitable means.

Secured in any suitable manner to the outer end of the element 41, is a rigid cap-piece 45 having a peripheral flange receiving said element, said part 45 having a pointed bearing 46 seated in the socket 16 heretofore described. The part 45 has an internal chamber receiving the tube 44, so that the latter is protected by said part.

The element 19 is connected by a tube 47 to any suitable source of pressure, for example, a thermostatic bulb, not shown, containing a volatile liquid, or an expansible liquid, which at certain temperatures will create pressure which will be exerted through the tube 47 into the element 19 and cause the latter to be expanded longitudinally, thereby operating to move the lever 11 upward, as will be apparent from Fig. 1 of the drawings. It is obvious that the element 19 may be actuated either by pressure generated from a volatile contained therein, or in a thermostatic vessel, or may be operated by changes in pressure at a source communicating with the tube 47.

In the event a volatile liquid is employed to act as a thermostatic element or agent, the bulb (not shown), or the element 19, will be charged with such liquid as may be demanded by the particular use to which the device is to be put, for example, for room control, the volatile liquid may be ethyl-chloride, or in the case of refrigeration control, may be methyl-chloride, carbon dioxide, or the like. It is obvious that the volatile liquid will be selected in accordance with the temperature or pressure condition desired to control the device.

Arranged in the casing above the lever 11, that is on the opposite side of said lever from the element 19, is a screw 48, one end of which is suitably fixed, as at 49, to the top wall 5 of the casing, and threaded on this screw so as to be adjustable longitudinally thereof, is a nut 50, which is seated loosely in a socket 51 in a spring follower 51ª, against which is seated one end of an expansion spring 52, the opposite end of said spring exerting its force against a spring seat 53 carrying a central, pointed pin 54 seated in the socket 15 in element 14, directly opposite the pointed bearing pin 46 heretofore described. By rotating the spring and follower 51ª so as to adjust the nut 50 and follower 51ª lengthwise of screw 48, the force exerted by said spring upon the lever, or its resistance to expansive action of power element 19, may be adjusted. For example, the spring 52 may be so adjusted as to exert a downward force of approximately 10.02 pounds when parts are in the relative positions shown in Fig. 1. It will be seen that the element 19 will tend, under certain conditions, to expand and to lift the lever 11, and that the resistance of the spring may be adjusted so as to give a predetermined resistance to the lever until a certain pressure of force is built up in the vessel 19 sufficient to overcome the spring, whereupon the lever will be moved by said element. It will also be seen that when the pressure in the element 19 drops below a predetermined point, the spring 52 will operate to move the lever in a direction opposite to that resulting from expansion of element 19.

At its forward or swinging end the lever 11 is provided with an arm 55, upon the outer end of which is a laterally extended rigid arm 56, having at its intermediate portion an opening 57, and at its free end a cylindrical bearing pin 58. Said lever 11 is also provided with suitable stop or limiting means, preferably consisting of an integral arm 59 projecting through an opening 60 in the rear wall 2 of the casing, said arm being adapted to co-operate with the upper and lower edges of said opening to limit the swinging movement of the lever in either direction. Riveted, or otherwise secured in opening 57, is an internally threaded bushing 61, and threaded through said bushing is a pin 62 extending lengthwise of the lever and having threaded thereon a lock-nut 63 adapted to engage the bushing to adjustably lock said pin to said arm 56. The pin is adjustable lengthwise through the arm 56, so as to project a greater or less distance beyond the swinging end of the lever 11, for a purpose to be presently described. The outer end of the pin 62 is pointed, as at 64, and is seated within a cup-shaped follower plate 65, against which is seated one end of a compression spring 66, the opposite end of which abuts a cup-shaped spring plate 67 which is seated upon a pin 68, preferably fixed in any suitable manner to the end wall 3 of the casing. It will be seen that by the arrangement just described, the spring 66 has an oscillating joint connection with the pin 62, and also with the pin 68.

By the arrangement just described, the spring 66 normally exerts its force expansively against the pin 62 in a direction substantially lengthwise of the lever 11, and tends either with spring 52 or element 19, to hold said lever in position at either limit of its upward or downward movement, according to the direction in which said lever is moved by either the power element 19 or spring 52. The tension or expansive force of spring 66 can be adjusted or regulated by adjustment of the pin 62 relative to the lever 11, the rear end of said pin being provided with one or more openings 69 adapted to receive any suitable tool whereby it may be rotated. Rearward movement of the pin 62 is limited by a stop 12ᵃ on the lever plate 12, so that said pin cannot be moved rearward far enough to be disengaged from the socket piece 65 which supports the spring 66, and also prevents loosening of spring 66 to such a point as to prevent desired quick action. It will be noted that when the lever is in either position of rest above or below a straight line extending through the fulcrum point 13, the apex of the socket 65 and the apex of the bearing pin 68, the force of the spring 66 is exerted along a line at an acute angle to the longitudinal axis of the lever, the purpose of which will appear more fully hereinafter.

Located at a suitable point within the casing, and preferably above the lever 12, is an oscillating contact-making device, preferably comprising a shaft 70 fixed in any suitable manner at one end, as at 71, to the casing wall 2, and on the shaft is mounted for swinging movement a bracket element 72 having apertured ears 73 receiving the shaft 70, and upon said shaft is one or more spring clip members (Figs. 1, 6 and 7), including resilient arms 74 adapted to receive between the same a mercury switch comprising a generally cylindrical sealed glass tube 75, internal contacts 76, and a globule of mercury 77 which, when the tube is oscillated longitudinally, flows into and out of engagement with said contacts to make or interrupt a circuit. The contacts are connected to suitable circuit leads 78 which lead from the casing through conduits 79, or in any suitable manner. Connected at one end, as at 78ᵃ, to the bearing part 58 on lever 11, is a link 79ᵃ, the opposite end of which is pivotally connected, as at 80, to an arm rigid with an ear 81 on bracket member 72 heretofore described, the arrangement being such that rocking of lever 11 serves through said link connection to swing the bracket on the shaft 70 to thereby tilt the tube or tubes 75 to cause the mercury 77 to flow in or out of engagement with the contacts 76.

The operation of the construction above described is as follows: It will be understood that the element 19, or the system in which it is connected, is evacuated to the desired degree and charged with a proper quantity of volatile or expansible substance necessary to suit the conditions of use, and to cause the element to expand and contract under determined temperature or pressure conditions. It will also be understood that said element has a neutral point from which the expansion or contraction is resisted by the resiliency of said element, due to its corrugated resilient construction. If the device is to be employed to operate on a very small differential relative to the pressure exerted by the volatile or expansible medium acting within the element 19, the parts may be adjusted and correlated as follows: It being premised that the engagement of the spring and the element 19 with lever 11 is one (1) inch from the fulcrum 13, and that in the position shown in Fig. 1 said element is compressed against its normal tendency to expand to its normal or neutral condition, the wall of the expansible element, due to the metal of which it is composed, and the corrugations thereof, will have an inherent resistance either to expansion or contraction beyond the neutral point, of approximately .368 pounds, and the spring 52 will be adjusted so as to exert a downward force against the element 19 of approximately 10 pounds—say, for example, 10.02 pounds. The bellows or element 19 will be arranged so as to exert an expansive force of approximately 10 pounds to the square inch when responding to the volatile at the desired critical or controlling temperature or pressure. In the case of said element having a head area of approximately 1.14 square inches, said element will, at an internal pressure of 10 pounds per square inch, exert an upward force of approximately 11.768 pounds, this being the sum of the force due to the natural tendency of the bellows to expand, namely, .368 pounds, plus the force resulting from the pressure per square inch. It will thus be seen that the downward force—10.02 pounds—of the spring 52 will be opposed by a force exerted by element 19 of approximately 11.768 pounds, i. e., the sum of the expansive force due to the resiliency of said element plus the force exerted by the internal pressure. It will thus be seen that as so far described, the element 19 when it responds to the critical temperature or pressure would overcome the spring 52 and start to compress the same if the bellows were opposed only by said spring. The spring 66 is adjusted so as to make up the difference between the force exerted by element 19 and that exerted by spring 52, so that the parts will be in a condition of substantial balance. For this purpose the screw 62, heretofore described, is adjusted by withdrawing it from the position shown in Fig. 1 until its rear end approximates the stop 12$^a$, so that the spring 66 will exert a force of approximately 7.4 pounds, which at the point of engagement of pin 64 will be a downward force on the lever of approximately .466 pounds, and this downward component transferred on the lever 11 at a point where the latter is engaged by the bellows and spring 52 will be approximately 1.748 pounds, which added to the downward force exerted by the spring 52, will oppose and counteract the expansive force of element 19, so that the parts will be in a condition of substantial balance, the result being that a very slight increase of force exerted by element 19 over and above an internal pressure of 10 pounds per square inch plus the resilient force due to the tendency of element 19 to expand, will serve to overcome the downward force exerted by springs 52 and 66, and will start movement of the lever 11 upward. At this adjustment the length of the lever from the point 64 to the point of application of spring 52 and element 19, is 2.75 inches. As heretofore stated, the spring 66 is arranged when the parts are in the position shown in Fig. 1, so as to exert its force in a line at an acute angle to the length of lever 11, and by this provision it is assured that as soon as the lever starts to move upward, the angle of application of the force of spring 66 on the lever will become more acute, with the result that the force of said spring, even though it be compressed, will be so exerted that its resistance to element 19 will be reduced at a greater rate than the resistance of spring 52 will be increased, so that element 19 will serve to quickly and sharply move lever 11 upward. This quick movement starts coincidently with the beginning of the movement of the lever, because the angle of application of force of spring 66 is reduced the instant the lever starts to move, and for the reason that the effectiveness of spring 66 upon element 19 is reduced in the same proportion that the angle is reduced, because for small angles the sine is proportional to the angle. This makes a balanced condition throughout the stroke. Due to the slight excess of pressure in the element 19 sufficient to overcome the springs 52 and 66 and start lever movement, the lever and spring 66 are carried across dead center by this slight excess pressure and the momentum of the lever. As the lever and spring 66 cross the line of centers, the angle of application of force of spring 66 on the lever is upward, so that the component of force of spring 66 acts with the element 19. Due to the fact that the component of force of spring 66 is changing at a uniform rate, which rate is greater than the rate of change of resistance of spring 52, the constant force exerted by element 19 will act in conjunction with the increasing component of force of spring 66 to move the lever to its uppermost position, thereby tilting vessel 75 to cause the mercury 77 to gravitate into position to immerse both contacts 76 and close a circuit.

It will be apparent from the foregoing, that the proper relative force to secure the operation described may be readily calculated for any pressure or temperature condition to which the device is intended to respond.

Under the conditions above mentioned, when the parts assume the uppermost limit of movement, they will remain in this position so long as the temperature or pressure maintains an upward force of 10 pounds to the square inch exerted by element 19, the parts being held up in said position by pressure of said element and the upward thrust of spring 66 against the downward thrust of spring 52, the force of which is somewhat increased when compressed, but not to an extent sufficient to return the lever so long as the force exerted by element 19 is maintained.

When the pressure in element 19 drops slightly and the upward force thereof is reduced so that the force of spring 52 is greater than the combined upward force exerted by said element and spring 66, the lever 11 is thrust downward, and as soon as this action takes place, the angle of force of spring 66 on the lever is reduced and the spring 52 overcomes said element and spring 66 to move the parts to initial position, as shown in Fig. 1, to break the circuit. The screw 62 is provided with a suitable stop 62ª, such as a cotter-pin to abut nut 63 and thereby limit projection of said screw to such a point as to compress spring 66 to give it such force when adjusted for greater differentials, as shown in Fig. 1, that its upward component transposed to point 15 will never be greater than the downward force of spring 52 when adjusted for its minimum compression. By this provision it is assured that the spring 52 will operate to throw lever 11 down whenever force of element 19 is reduced to the low point of the desired differential at which lever 11 is to be moved down.

In cases where a greater degree of differential in temperature or pressure is desired to operate the device, the adjusting screw 62 may be projected toward the spring 66 to compress the same to the position shown in Fig. 1, and thereby increase its force, for example, the length from the point of the screw to the point at which the lever is engaged by spring 52 and the bellows being 3.187 inches, and the distance from point 64 to point of pin 68 being .937 inches when said points and fulcrum 13 are on a straight line. When the instrument is to be adjusted to operate at an average pressure of 10 pounds per square inch in the bellows, and with a greater differential than that above described, the adjustment may be approximately as follows: The spring 66 is adjusted to approximately 16.15 pounds, and the downward component of which at point of pin 64 will be 1.645 pounds, which will exert a downward force of substantially 6.9 pounds on the lever at the point where the latter is engaged by element 19 and spring 52, and the force of spring 52 is maintained by the adjustment named in the previous example—say, approximately 10.02 pounds. Under these circumstances, with the parts in the position indicated in Fig. 1, and with the element 19 compressed so as to exert a resilient expansive force of approximately .368 pounds, the total downward force will be approximately 16.552 pounds (10.02 pounds plus 6.9 pounds less .368 pounds), so that it will be necessary for the pressure in the bellows to be built up to approximately 14.52 pounds per square inch in element 19 before the lever will start to move upward. The movement or action of the parts is then as heretofore described.

When the lever 11 and spring 66 reach the intermediate or dead center position, the spring 66 of course has no action on the lever 11, and the spring 52 exerts its normal force of 10.02 pounds plus 1.38 pounds, the increase being at a uniform rate and due to the fact that the spring is designed to compress 1 inch under 60 pounds, and becomes compressed approximately .023 inches in moving from the position shown in Fig. 1 to the intermediate position. The element 19 at this point is neutral, exerting no force either up or down, due to its resiliency, and therefore the only downward force is that exerted by spring 52— namely, 11.4 pounds, which the 14.52 pounds per square inch within element 19 will be sufficient to overcome. As soon as the parts pass the dead center position on their way to the upper position, the element 19 is extended so that its natural resilient tendency to contract will become approximately .368 pounds, and the downward force of spring 52 will be increased to 12.78 pounds, as said spring is further compressed at the rate above mentioned. The upward force of spring 66 acting at the point where the lever is engaged by the spring 52 and the element 19, is the same as the upward force exerted when the parts are in the position shown in Fig. 1, namely, 6.9 pounds, so that the resultant downward force on the lever is .368 pounds plus 12.78 pounds minus 6.9 pounds, and the parts will be maintained in this position until the pressure in element 19 is reduced to approximately 5.48 pounds per square inch, whereupon the parts will move toward lower position. In this example, when the parts are adjusted as described, a pressure of 14.52 pounds per square inch in the bellows is necessary to start the lever upward, but when the lever starts upward less pressure is required to move the lever, due to the change of position of spring 66, so that the lever will snap immediately to the top of its stroke. The example also shows that the pressure in the bellows must drop to 5.48 pounds per square inch before the lever will return to its lowermost position. This gives a differential of 9.04 pounds per square inch upon which the mechanism operates, that is, 4.52 pounds per square inch either side of the average operating point of 10 pounds per square inch.

It will also be understood that when the parts are in the position shown in Fig. 1, the element 19 is collapsed against its resilient tendency to expand, so as to exert an upward force of approximately .368 pounds; that the bellows is in substantially its neutral position so far as the resiliency is concerned when the lever is in the intermediate position along line $a$—$b$ of Fig. 1, that is, the resiliency of the bellows does not tend to either contract or expand the same, and that when the lever is in its upward position the bellows is extended against its resilient capacity to contract so as to exert a downward force of approximately .368 pounds.

It will be apparent from the foregoing description that the spring 66, by reason of the fact that one end thereof is held at a fixed point, will have its force acting on the lever varied or changed uniformly, or at a uniform rate for each increment of lever movement, throughout the range of movement of the lever, as is also true of spring 52, so that a force which will start movement of the lever will, without any increase thereof, act to move the lever completely through its range of movement.

While I have shown the lever 11 and the spring 66 cooperating to swing past a dead center position, it will be understood that the quick or snap action provided is not dependent entirely upon this mode of operation, but that the quick action desired will take place under proper adjustment, as before set forth, as soon as the element 19 exerts sufficient force to move the lever. In other words, while I have shown in the preferred embodiment an arrangement in which the lever 11 and spring 66 swing by a dead center position in moving from one extreme to the other, nevertheless the parts could, without departing from the spirit and scope of my invention, be so arranged as not to move past a dead center when moving upward from the position shown in Fig. 1, the snap action taking place in such case in the same manner as soon as the element 19 exerts sufficient force to move the lever. For example, this may be accomplished by raising the bearing pin 68 to a higher point so that when the parts are in their upper position they will come to rest below, or aproximately on a straight line drawn through said pin, the point of pin 64, and the fulcrum 13ª.

It will also be apparent that while I have described the element 19 as being expanded by or responding to pressures depending upon response of a volatile agent to changes in temperature, it will be understood that the pressure may be that developed by a fluid or gas exerting itself within the element.

In Fig. 9 is shown another means for adjusting the force of spring 52, in which the upper spring seat 51 is provided with a central socket 51ª to receive the pointed lower end 51ᵇ of a screw 51ᶜ which is threaded through a bushing 51ᵈ rigidly mounted in the top wall 2 of the casing and secured thereto in any suitable manner. By this construction the spring-plate has some freedom to rock, to compensate for any side play of the spring 52.

By arranging the points of engagement of bearing pins 46 and 54 with lever 11 directly opposite each other, the friction on bearings 13 is reduced to a minimum.

What I claim and desire to secure by Letters Patent of the United States is:—

1. In a device of the character described, a movable controlling device, a lever operatively connected to said device and fulcrumed at one end, an expansible-collapsible element located at one side of said lever and operable to move the lever in one direction, a spring located on the opposite side of said lever and opposing action of the same by said element and being operable to move said lever in the opposite direction, and a regulating spring having a fixed support at one end and acting lengthwise on said lever, said regulating spring being adjustable to determine the operating differential of said device by said element and by said first-named spring.

2. In a device of the character described, a movable circuit-controlling device, a lever, a link connecting said lever and device, said lever being fulcrumed at one end, an expansible-collapsible element located at one side of said lever and operable to move the lever in one direction, a spring located on the opposite side of said lever and opposing action of the same by said element, and a regulating spring adjustable to control the operating differential of said device and acting lengthwise of said lever and exerting its force directly on said lever at an acute angle to the longitudinal axis of the lever, whereby the effective angle at which the force of said regulating spring is exerted on said lever is reduced when the lever is moved by said element.

3. In a device of the character described, a movable circuit-controlling device, a lever having a connection with said device to move the same, said lever having a lateral arm supporting a pin extending lengthwise of said lever, an expansible-collapsible element to move said lever in one direction, a spring opposing said element and operable to move said lever in the opposite direction, and a second spring opposing said element when in one position and having a rocking support at one end and at its other end engaging said pin, said support being so arranged that the resistance of the second spring to said element is reduced when the said element acts to move said lever.

4. In a device of the character described, a movable circuit-controlling device, a lever having a connection with said device to move the same, a pin mounted on said lever and extending lengthwise thereof, an expansible-collapsible element to move said lever in one direction, a spring opposing said element and operable to move said lever in the opposite direction, and a second spring opposing said element when in one position and having a rocking support at one end and at its other end engaging said pin, said support being so arranged that the resistance of the second spring to said element is reduced when the said element acts to move said lever.

5. In a device of the character described, a movable circuit-controlling device, a lever having a connection with said device to move the same, a pin having a threaded support on said lever and adjustable lengthwise thereof, an expansible-collapsible element to move said lever in one direction, a spring opposing said element and operable to move said lever in the opposite direction, and a second spring opposing said element when in one position and having a rocking support at one end and at its other end engaging said pin, said support being so arranged that the resistance of the second spring to movement of the lever is reduced when the said element acts to move said lever.

6. In a device of the character described, a movable circuit-controlling device, a lever having a connection with said device to move the same, said lever having a lateral arm, a pin threaded on said arm and extending lengthwise of said lever, an expansible-collapsible element to move said lever in one direction, a spring opposing said element and operable to move said lever in the opposite direction, and a second spring opposing said element when in one position and having a rocking support at one end and at its other end engaging said pin, said support being so arranged that the resistance of the second spring to the movement of the lever is reduced when the said element acts to move said lever.

7. In a device of the character described, a movable circuit-controlling device, a lever having a connection with said device to move the same, said lever having a lateral arm, means to limit swinging movement of said lever, a pin threaded on said arm and extending lengthwise of said lever, an expansible-collapsible element to move said lever in one direction, a spring opposing said element and operable to move said lever in the opposite direction, and a second spring opposing said element when in one position and having a rocking support at one end and at its other end engaging said pin, said support being so arranged that the resistance of the second spring to the movement of the lever is reduced when the said element acts to move said lever.

8. In a device of the character described, a movable circuit-controlling device, a lever having a connection with said device to move the same, said lever having a lateral arm, a pin threaded on said arm and extending lengthwise of said lever, a second arm on said lever and cooperating with means to limit swinging movement of the lever, an expansible-collapsible element to move said lever in one direction, a spring opposing said element and operable to move said lever in the opposite direction, and a second spring opposing said element when in one position and having a rocking support at one end and at its other end engaging said pin, said support being so arranged that the resistance of the second spring to movement of said lever is reduced when the said element acts to move said lever.

9. In a device of the character described, a movable circuit-controlling device, a lever comprising a substantially flat plate having a lateral projecting arm on one side, a pin adjustably mounted on said arm, a stop arm on the opposite side of said lever and cooperating with means to limit swinging movement of the lever, a link connection between said lever and said circuit-controlling device, an expansible-collapsible element to move said lever in one direction, a spring opposing said element and operable to move said lever in the opposite direction, and a second spring opposing said element when in one position and having a rocking support at one end and at its other end engaging said pin, said support being so arranged that the resistance of the second spring to movement of said lever is reduced when the said element acts to move said lever.

10. In a device of the character described, a casing, a movable circuit-controlling device, a lever comprising a substantially flat plate having ears projecting through apertures in the casing wall to constitute a fulcrum for the lever, said lever having an arm at one side, a pin adjustably mounted on said arm, a stop arm at the opposite side of said lever and cooperating with means to limit swinging movement of the lever, an expansible-collapsible element to move said lever in one direction, a spring opposing said element and operable to move said lever in the opposite direction, and a second spring opposing said element when in one position and having a rocking support at one end and at its other end engaging said pin, said support being so arranged that the resistance of the second spring to movement of said lever is reduced when the said element acts to move said lever.

11. In a device of the character described, a movable circuit-controlling device, a lever having a connection with said device to move the same, said lever having a lateral arm supporting a pin extending lengthwise of said lever, an expansible-collapsible element to move said lever in one direction, and a spring opposing said element when in one position and having a rocking support at one end and at its other end engaging said pin, said support being so arranged that the resistance of the spring to movement of said lever is reduced when the said element acts to move said lever.

12. In a device of the character described, a movable circuit-controlling device, a lever having a connection with said device to move the same, said lever having a lateral arm, a pin threaded on said arm and extending lengthwise of said lever, a second arm on said lever and cooperating with means to limit swinging movement of the lever, an expansible-collapsible element to move said lever in one direction, and a spring opposing said element when in one position and having a rocking support at one end and at its other end engaging said pin, said support being so arranged that the resistance of the spring to movement of said lever is reduced when the said element acts to move said lever.

13. In a device of the character described, a movable circuit-controlling device, a lever comprising a substantially flat plate having a lateral projecting arm on one side, a pin adjustably mounted on said arm, a stop arm on the opposite side of said lever and cooperating with means to limit swinging movement of the lever, a link connection between said lever and said circuit-controlling device, an expansible-collapsible element to move said lever in one direction, and a spring opposing said element when in one position and having a rocking support at one end and at its other end engaging said pin, said support being so arranged that the resistance of the spring to movement of said lever is reduced when the said element acts to move said lever.

14. In a device of the character described, a movable circuit-controlling device, a lever operatively connected to said device and fulcrumed at one end, an expansible-collapsible element located at one side of said lever and operable to move the same in one direction, a spring located on the opposite side of said lever and engaging the latter to oppose action of said element, said element and spring each having a pin and socket engagement with said lever at points directly opposite each other, and a second spring acting lengthwise of said lever and exerting its force on said lever at an acute angle to the longitudinal axis of the lever, whereby the effective angle at which the force of said second spring is exerted on said lever is reduced when the lever is moved by said first-named element.

15. A device of the character described including a controlling device, an actuating lever operatively connected to said device and having a position of rest and an operative range of movement, means adapted to exert a predetermined constant actuating force on said lever to move the same through said range, a plurality of controlling springs resisting actuation of said lever by said means and jointly determining the predetermined constant actuating force to be exerted by said means to move said lever, one of said springs being so located as to have its resistance increased as the lever moves from its position of rest but not to such extent as to prevent movement of the lever throughout its operative range by said predetermined constant force, and means for supporting one end of said other spring at a fixed point and having a component of its force resisting said first-named means and such that said component is automatically reduced at such predetermined rate when the lever starts to move that the predetermined constant actuating force which initiates movement of said lever overcomes the resistance of both springs, and moves said lever throughout its operative range.

16. A device of the character described including a controlling device, an actuating lever operatively connected to said device and having a position of rest and an operative range of movement, means adapted to exert a predetermined unincreased actuating force on said lever to move the same through said range, a plurality of controlling springs resisting actuation of said lever by said means and jointly determining the predetermined actuating force to be exerted by said means to move said lever, one of said springs being so located as to have its resistance increased as the lever moves from its position of rest but not to such extent as to prevent movement of the lever throughout its operative range by said predetermined unincreased force, means for supporting one end of said other spring at a fixed point and having a component of its force resisting said first-named means and such that said component is automatically reduced at such predetermined rate when the lever starts to move tha the predetermined actuating force which initiates movement of said lever overcomes the resistance of both springs, and moves said lever throughout its operative range, and means for adjusting the resistance of each of said springs.

17. A device of the character described comprising a controlling device, an actuating lever operatively connected to said device and having a position of rest and a range of movement, spring means opposing movement of said lever with a predetermined initial force, said spring means having a predetermined increase of resistance upon movement of said lever through its range of movement, spring means having one end supported at a fixed point and opposing movement of said lever at an acute angle and acting in conjunction with said first spring means, the force exerted by said second spring means on said lever at the point of application of said first spring means when the lever is at rest being greater than the predetermined increase of resistance of said first spring means, said second spring means acting on said lever at such an acute angle that the force of said second spring means decreases proportionally to the decrease of the angle upon movement of the lever whereby the rate of decrease of force of the second spring means is greater than the rate of increase of force of the first spring means so that a constant force which will act to overcome the combined resistance of said first and said second spring means to initiate movement of the lever will move said lever throughout its range of movement.

18. In a device of the character described, a movable controlling device, a lever operatively connected to said device and having a position of rest and a range of movement, means opposing movement of said lever with a predetermined initial resistance, said means having a predetermined increase of resistance upon movement of said lever throughout its range, actuating means operable on said lever for exerting a predetermined actuating force to initiate movement of said lever, said actuating force being greater than the predetermined resistance of said opposing means plus the said predetermined increase of resistance, a second means opposing movement of said lever by said actuating means with a predetermined maximum resistance greater than said predetermined increase of resistance, the combined resistance of said first opposing means and said second opposing means when the lever is at rest being substantially equal to said predetermined actuating force, means whereby said second opposing means exerts a predetermined less resistance when said lever has been moved through its range whereby said second opposing means has a predetermined decrease of resistance, said predetermined decrease of resistance being greater than the said predetermined increase of resistance of said first-opposing means whereby when said actuating means exerts said predetermined actuating force said lever will be moved throughout its range of movement.

19. In a device of the character described, comprising a reciprocable lever having a fulcrum support and a range of movement, a spring exerting a force to resist movement of said lever and having a predetermined uniform increase of resistance for the range of lever movement, a second spring having one end fixed and acting at its other end at an acute angle on said lever to exert a force resisting movement of said lever, said second spring having a uniform change of resistance throughout the range of lever movement, said second spring resistance decreasing upon initial movement of the lever at a greater rate than the rate of increase of resistance of said first spring, a resilient expansible-collapsible hollow element normally acting by its resilient force to move said lever, said element having a uniform change in its resilient force which decreases upon movement of said lever, the sum of the resistances of said first spring and said second spring less the resilient force of said element predetermining the pressure within said element to initiate movement of said lever, said forces and predetermined pressure comprising a balanced system for all positions of said lever such that after movement of said lever through its range, any decrease of said predetermined pressure sufficient to permit friction of the parts to be overcome will cause return movement of said lever completely through its range of movement.

20. A device of the character described, comprising a controlling device, a lever for actuating said device and so connected thereto that initial movement of said lever moves said device, spring means resisting movement of said lever, a second spring means having one end fixed and having its other end acting on said lever at an acute angle thereto whereby the component of force of said second spring means acting on said lever varies at a uniform rate throughout the movement of said lever, the combined force of the force of said first-named spring means and the component of force of said second-named spring means opposing movement of said lever, the said component of force decreasing upon initial movement of said lever and changing uniformly at a greater rate than the rate of increase of resistance of said first-named spring means throughout the range of lever movement, whereby a force which will initiate movement of said lever will act to move said lever completely through its range of movement.

21. A device of the character described, comprising a controlling device, a lever operable to move said device and having a range of movement, means interconnecting said lever and said device to cause initial movement of said lever to move said device, spring means resisting movement of said lever, a second spring means having one end fixed and having its other end acting on said lever at an acute angle thereto whereby the component of force of said second spring means acting on said lever varies at a uniform rate throughout the movement of said lever, the combined force of the force of said first-named spring means and the component of force of said second-named spring means opposing movement of said lever, the said component of force decreasing upon initial movement of said lever and changing uniformly at a greater rate than the rate of increase of resistance of said first-named spring means throughout the range of lever movement, whereby a force which will initiate movement of said lever will act to move said lever completely through its range of movement.

22. A device of the character described, comprising a controlling device, a lever operatively connected to said device for substantially simultaneous movement of said device upon movement of said lever, said lever being movable quickly through its range of movement upon initial movement thereof, spring means resisting movement of said lever, a second spring means having one end supported at a fixed point and acting at an acute angle on said lever and so positioned as to have its angle of application reduced upon initial movement of said lever, the relative forces of said spring means being such that the component of force of said second spring means resisting said lever decreases upon initial movement of said lever at a greater rate than the rate of increase of resistance of said first spring means whereby the combined resistance of said spring means to movement of said lever decreases uniformly for each increment of movement of said lever whereby said controlling device is moved quickly and substantially simultaneously with the movement of said lever, and means operable to exert a predetermined force on said lever substantially equal to the combined resistance of both said spring means whereby to cause movement of said lever completely through its range of movement.

23. A device of the character described, comprising a switch tube having a fulcrum support, a lever having a fulcrum support, a link interconnecting said lever and said tube whereby said lever and said tube are movable substantally simultaneously, said lever being movable quickly through its range of movement upon initial movement thereof, spring means resisting movement of said lever, a second spring means having one end fixed and acting at an acute angle on said lever and so positioned as to have its angle of application reduced upon initial movement of said lever, the relative forces of said spring means being such that the component of force of said second spring means resisting said lever decreases upon initial movement of said lever at a greater rate than the rate of increase of resistance of said first spring means whereby the combined resistance of said spring means to movement of said lever decreases uniformly for each increment of movement of said lever whereby said tube is moved quickly and substantially simultaneously with the movement of said lever, and means operable to exert a predetermined force on said lever substantially equal to the combined resistance of both of said spring means whereby to cause movement of said lever completely through its range of movement.

24. A device of the character described, comprising a movable controlling means, a lever having a fixed fulcrum and movable from a position of rest, a connection between said lever and controlling means whereby movement of the lever from its position of rest will be imparted to said controlling means, power means adapted to exert a force to move said lever, a range-determining spring opposing said power means, and a differential-determining spring exerting its force to oppose said power means and mounted on a fixed point independent of said lever and said connection, the combined opposing forces of said springs being such as to predetermine the operating force of said power means effective to move said lever.

25. A device of the character described, comprising a movable controlling means, a lever having a fixed fulcrum and movable from a position of rest, a connection between said lever and controlling means whereby movement of the lever from its position of rest will be imparted to said controlling means, power means adapted to exert a force to move said lever, a range-determining spring opposing said power means, and a differential-determining spring exerting its force to oppose said power means and having one end mounted on a point which is fixed relative to said fulcrum and independent of said lever and said connection, the combined opposing forces of said springs being such as to predetermine the operating force of said power means effective to move said lever.

26. A device of the character described, comprising a movable controlling means, a lever having a fixed fulcrum at one end and movable from a position of rest, a connection between said lever and controlling means whereby movement of the lever from its position of rest will be imparted to said controlling means, power means adapted to exert a force to move said lever, a range-determining spring opposing said power means, and a differential determining spring having one end mounted on a point which is fixed relative to said fulcrum and independent of said lever and said connection, and having its other end acting directly on the swinging end of said lever opposite to said fulcrum, the combined opposing forces of said springs being such as to predetermine the operating force of said power means effective to move said lever.

In testimony whereof I have hereunto subscribed my name.

LEWIS W. EGGLESTON.